UNITED STATES PATENT OFFICE.

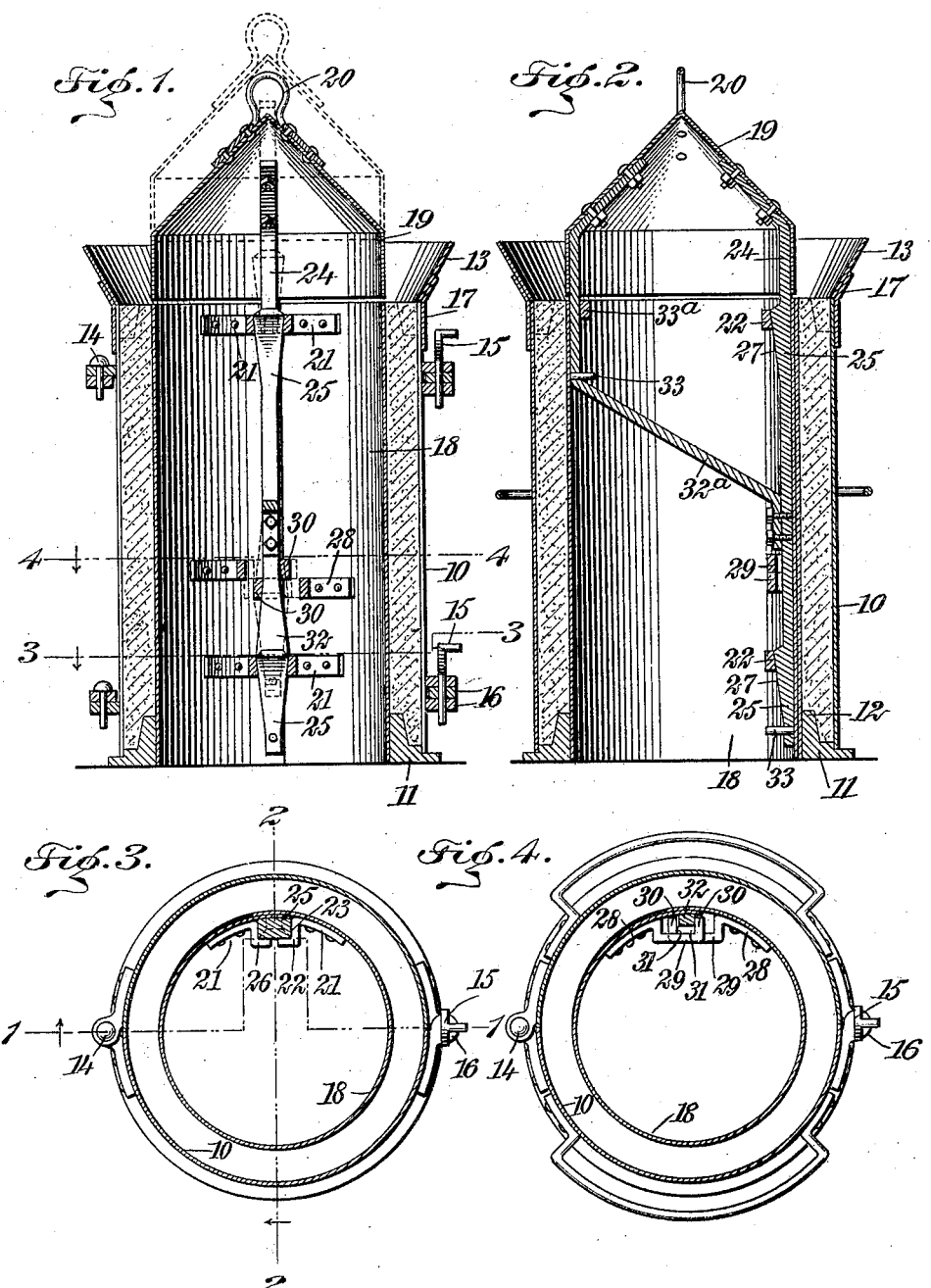

HERMAN BESSER, OF ALPENA, MICHIGAN.

MOLD FOR HOLLOW ARTICLES.

No. 822,040.　　　　　Specification of Letters Patent.　　　Patented May 29, 1906.

Application filed January 6, 1906. Serial No. 294,872.

*To all whom it may concern:*

Be it known that I, HERMAN BESSER, a citizen of the United States, and a resident of Alpena, in the county of Alpena and State of Michigan, have invented a new and Improved Mold for Hollow Articles, of which the following is a full, clear, and exact description.

My invention relates to a mold for hollow articles, especially that class which are molded in a vertical position—as, for example, drain-tiles and the like.

The principal object of the invention is to provide means whereby an expansible core can be readily and positively expanded and contracted by a very simple motion and to provide for this in a most simple and convenient manner.

Reference is to be had to the accompanying drawings, forming a part of this specification, in which similar characters of reference indicate corresponding parts in all the figures.

Figure 1 is a sectional view on the line 1 1 of Fig. 3 of a mold with a preferred form of my improvement applied thereto. Fig. 2 is a sectional view on the line 2 2 of Fig. 3. Fig. 3 is a sectional view on the line 3 3 of Fig. 1, and Fig. 4 is a sectional view on the line 4 4 of Fig. 1.

I have illustrated my invention as applied to the manufacture of vertical drain-tiles. For this purpose I have shown a mold 10 mounted on a bottom plate 11, provided with an annular plate 12 for forming the socket end of a pipe or tile. At the top of the mold is shown a collar 13, constituting a hopper for directing the molding material into the mold. The mold is shown as being formed in two parts connected together by a pivot or hinge 14 and secured in closed position by means of a locking-pin 15 passing through holes in projections 16 on the two parts. The hopper is provided with guides 17 to permit its being placed in position on the mold after it is closed and to center it thereon. Within the mold and centered by the plate 11 is a core 18. As is usually the case, this is surmounted by a cap 19. This cap is provided with an eye 20, by means of which it can be lifted after the molding material is introduced, so as to remove the core from the molded article.

For the purpose of providing for readily detaching the core from the molded article I have constructed the former of sheet material having overlapping edges on one side, and I have provided means whereby these edges can be manipulated so that the overlapping portions will be drawn inwardly and forced outwardly at the desired time in order to expand and contract the core in a positive manner. For this purpose I have shown two sets of brackets 21 on the two edges of the core which overlap. These brackets are provided with projections 22, extending inwardly, said projections having bearing-surfaces 23 on their inner sides and facing each other. It will be observed that the bearing-surface 23 of each bracket is on the same side of the overlapping joint that the bracket is on. Consequently when a wedge is forced between the bearing-surfaces 23 they will be forced apart and the core expanded in an obvious manner. The two pairs of brackets which I have illustrated are located at the same distance apart, one near the top and the other near the bottom of the core, and in order to operate them to expand the core and positively hold it in an expanded position during the molding operation I have provided a bar 24, adapted to reciprocate in a vertical direction, and on this bar I have located two wedges 25, adapted to pass between the bearing-surfaces 23 of the two sets of brackets. It will be noticed that the brackets have additional projections 26, extending toward each other, and that the wedges 25 have slanting surfaces 27 on their inner sides engaging the outer surfaces of the projections 26. This assists in forcing the overlapping edges of the core apart and holds them positively in their expanded position. It is to be understood that in the form illustrated the expanding operation is performed when the bar 24 is lowered. When it is desired to contract the core, the raising of the bar 24, if it were merely constructed as so far described, would release the positive force for holding the core expanded and permit it to contract. My invention contemplates the use of the device so constructed; but I prefer to provide positive means for contracting the core and have shown an additional pair of brackets 28 for this purpose. These brackets, as is shown in Fig. 4, have projections 29 extending toward each other, and in fact overlapping each other, so that each projection overlaps the joint in the core. At their inner ends these projections have extensions 30, which in turn have inside bearing-surfaces 31. It will be observed that the passage of a wedge through the space between the two bearing-surfaces 31, forcing them apart, will force the brackets 28 as a whole toward each other, and consequently will contract the flexible core. For accomplishing this result I have shown a wedge 32 placed adjacent to one of the wedges 25 on the bar 24 and extending in the opposite direction. It will be readily observed that when the bar 24 is raised this wedge will enter the space between the surfaces 31 as rapidly as the wedges 25 are withdrawn from the spaces between the surfaces 23. Consequently while the wedges 25 by their withdrawal unlock the core the wedge 32 pulls the parts together and contracts it.

For the purpose of manipulating the rod 24 it is secured to the cap 19 in a direct manner. Also for the purpose of preventing a side motion or a binding action of the rod when the cap is lifted in a vertical direction I have shown a tie 32ª extending from the side of the cap 19 opposite that at which the bar 24 is connected with it in a downward direction and then diagonally across to a point on the bar at a lower level.

It will be evident from the above description that the connection between the cap and the core is a lost-motion connection, such connection permitting a limited relative movement of the parts.

The operation of the device will be obvious. When the mold is completed, either before or after the top plate is removed, the cap 19 is lifted. The first part of this lifting operation results in a contraction of the core, this contraction continuing as long as the wedges are being withdrawn from the brackets; but as soon as they are removed from the brackets and the vertical motion of the bar 24 with respect to the core arrested by stops 33 engaging, respectively, one of the projections 22 and a bar 33ª further motion of the cap will raise the core out of the mold. It will of course be understood that the slanting upper surface of the cap acts in the usual manner as a portion of the hopper to direct the molding material into the mold and that when the cap is replaced in the mold before the molding operation is completed the core will be automatically expanded and locked in the expanded position.

Having thus described my invention, I claim as new and desire to secure by Letters Patent—

1. In a device of the character described, the combination with the mold, of a collapsible core, a cap connected to the core, and means whereby traction upon the cap will collapse the core.

2. In a device of the character described, the combination with the mold, of a collapsible core, a cap movably connected with the core, and means whereby the movement of the cap from the core may contract said core and whereby movement of the cap toward the core may expand the said core.

3. In a device of the character described, the combination with a mold, of a core, means for contracting and expanding said core, a cap in connection with the core, means whereby a preliminary movement of the cap with respect to the core will operate said means to contract the core, and whereby a further movement will lift said core.

4. In a device of the character described, the combination with the mold, of a collapsible core, a cap having a lost-motion connection with said core whereby to permit a limited relative movement of the cap and core, and means whereby the relative movement of said cap and core will expand and contract the core.

5. In a core the combination of a flexible shell having overlapping edges, a pair of brackets located opposite each other near said edges, said brackets having projections extending toward and overlapping each other, and outwardly-facing extensions on the ends of said projections, said extensions having bearing-surfaces facing each other, and a wedge adapted to pass between said surfaces and engaging them for positively contracting the shell.

6. In a core the combination of a flexible shell having two free edges, two pairs of brackets located opposite each other near said edges, each bracket having a bearing-surface facing the opposite bracket, a second pair of brackets located opposite each other near said edges, a third pair of brackets each having overlapping projections provided with bearing-surfaces facing each other, and a bar provided with a pair of wedges for engaging the first two pairs of brackets, and a third wedge facing in the opposite direction for engaging the third pair of brackets.

7. In a core the combination of a flexible shell, means for collapsing and expanding the shell comprising a bar having wedges thereon, a cap at the end of the core to which said bar is fixedly connected, and a cross-tie connected with said bar at a point within the core and connected with the cap at the side opposite to that at which the bar is connected with it.

In testimony whereof I have signed my name to this specification in the presence of two subscribing witnesses.

HERMAN BESSER.

Witnesses:
J. H. BESSER,
CHESTER KEEGAN.